June 11, 1957 W. M. VENNER ET AL 2,795,468

TRUNK PISTON

Filed May 2, 1955

INVENTORS:
WILLIAM M. VENNER
PERCY L. BOWSER JR.
WILLIAM F. PETERSON

By Bruninga & Sutherland
ATTORNEYS.

United States Patent Office 2,795,468
Patented June 11, 1957

2,795,468

TRUNK PISTON

William M. Venner, Brentwood, Percy L. Bowser, Jr., Ladue, and William F. Peterson, Creve Coeur, Mo., assignors to Sterling Aluminum Products, Inc., St. Louis, Mo., a corporation of Missouri Application May 2, 1955, Serial No. 505,362

2 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 12%, the thermal expansion is materially reduced. Copper, nickel and manganese impart hardness and strength to the alloy. The temperatures encountered in internal combustion engines are however, high, so that there is liability of seizure when hot and a looseness when cold.

A trunk piston of the type described as heretofore constructed, comprises a head, a skirt, and wrist pin bosses on the inside of the skirt. The head is grooved to receive the piston rings and is of smaller diameter than the skirt, which provides the guiding cross-head for the piston. The skirt is separated from the head in one or both regions of the thrust faces by circumferential slots. The skirt may be of circular contour but is usually made oval with the major diameter in the regions of the thrust faces and with the minor diameter in the regions of the bosses. Some pistons have vertical slots. Furthermore, the piston is also relieved in the regions of the bosses. The skirt is usually given a standard taper with a smaller diameter at the top. By reason of the circumferential slots, the strength of the piston, the conduction of the heat from the head to the skirt and hence from the piston walls is reduced and oil leakage from between the cylinder and the skirt to the head is increased.

One of the objects of this invention is to provide a piston of the type described whereby the expansion of the piston may be controlled so as to maintain a close fit in the cylinder, whether the piston be hot or cold, but in which the strength of the piston is increased, the conduction of the heat from the head to the skirt and hence to the cylinder is increased and oil leakage is practically eliminated.

Further objects will appear from the detailed description in which will be set out an illustrative embodiment of this invention; it is to be understood however, that this invention is susceptible of various embodiments within the scope of the appended claims.

Referring to the drawing.

Figure 1:
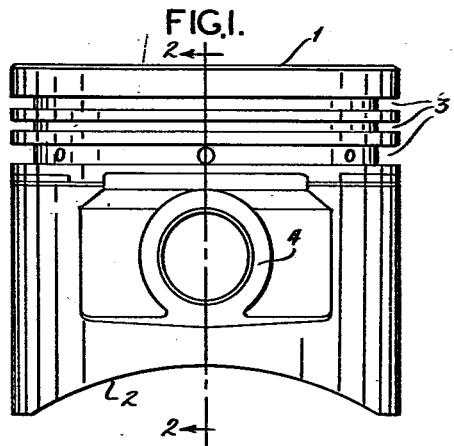
Figure 1 is a side view of a piston embodying this invention.
Figure 2:
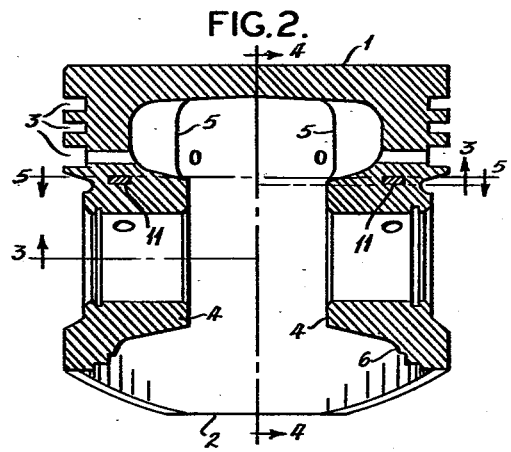
Figure 2 is a section on the line 2—2, Figure 1.

Generally stated, and in accordance with an illustrative embodiment of this invention, a trunk piston of a metal of relatively high thermal expansion comprises a head, a skirt provided with wrist pin bosses and with thrust faces, and provided with a control element of a metal of relatively low thermal expansion, lying within and extending partly or completely around the top of the skirt and over which the piston metal is cast, permanently cast anchored in the regions of the bosses, but unanchored axially in one or both of the regions of the thrust faces and having a part or parts bearing against one or both of the thrust faces inside of the skirt. The control element is, however, so combined with the piston metal that the usual circumferential slots are practically eliminated while still permitting expansion and contraction of the piston in the cylinder.

In the piston described, the control element is, as noted above, of a metal of relatively low thermal expansion. This ring may be made of cold rolled steel which has about the same co-efficient of thermal expansion as has the cylinder wall. However, the control element or ring, may be made of a steel or metal having a very low co-efficient of expansion, approaching zero. Such steel is well-known and has heretofore been employed as control elements for aluminum and magnesium alloy pistons.

Referring now to the accompanying drawing and more particularly to Figures 1–4, 1 designates the head and 2 the skirt of a piston of the type described. The head, which is made somewhat smaller than the skirt, is provided with packing ring grooves 3, while the skirt is provided with inwardly extending wrist pin bosses 4. There may also be ribs 5, extending from the bosses to the head to give additional strength. The skirt itself however, is made thin, particularly in the regions of the thrust faces and may also be externally relieved in the boss regions and provided at the bottom with the usual balancing lugs 6.

The control element generally indicated at 10 is made of a metal of relatively low thermal expansion, as previously described. This element has side parts 11 adapted to be surrounded by the piston metal in the boss regions, and in Figures 1–5, connected parts 12 in the thrust face regions. These parts 12 in Figures 1–5 have flanges 13 bearing against the inside face 14 of the skirt, but the parts 12 themselves extend to the outside of the skirt thereof.

In the method of making the trunk piston, the head and the skirt of high thermal expansion are cast over the control element 10 of relatively low thermal expansion with the piston metal surrounding and anchoring the element in the regions of the bosses, but leaving the element exposed internally and unanchored radially in the regions of the thrust faces. This can be accomplished in a permanent mold having a permanent core of the type shown in United States Patent No. 2,129,351 and 2,676,372, the mold being shown in Figure 6 at 20 with a top 22, and the center core at 21 which may be of the five-piece type as shown in the above patents. The element 10 is simply placed on top of the core, as shown in Figure 6 and the piston metal is then cast in the mold and over the core thereby producing a piston of the construction shown in Figures 1–5.

Figure 3:
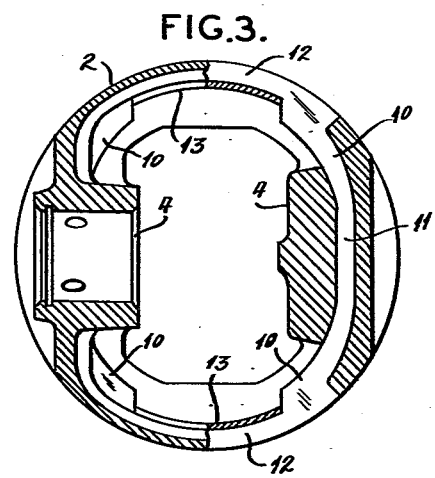
Figure 3 is a section on the line 3—3, Figure 2.
Figure 4:
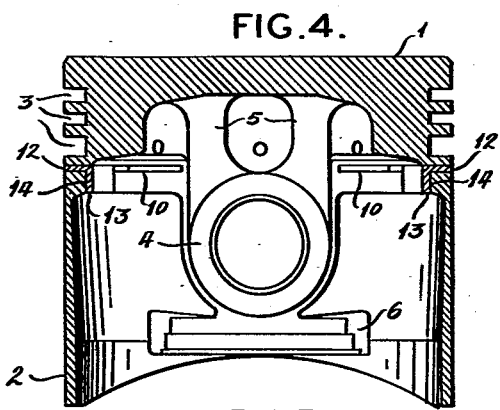
Figure 4 is a section on the line 4—4, Figure 2.
Figure 5:
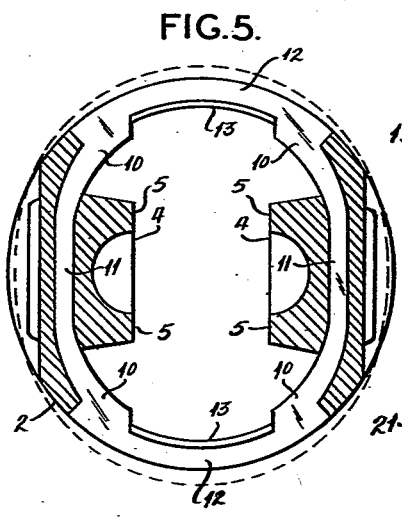
Figure 5 is a diagrammatical view on the line 5—5, Figure 2, and illustrating the principle of this invention.

After the completion of the pouring of the piston metal in the mold, the parts will be in the position shown in Figure 3, with the side parts 11 of the element 10 surrounded by the piston metal, with the sectors 12 extending through the thrust faces and with the parts 13 bearing against the inside thereof. However, after the piston cools down to room temperature, the parts will assume the position shown in Figure 5, dotted lines. That condition is brought about because in cooling from the solidifying temperature of the piston metal to room temperature, the aluminum piston metal will shrink much faster than will the steel control element 10, and in doing so, the piston metal surrounding the side parts 11 of the element 10 will shrink thereon so as to permanently cast-anchor the element in the boss regions. However, the sectors 12 of the element extending through the thrust faces are radially unanchored therein. The element 10 will tend to hold back the inward radial contraction of the piston metal on the thrust face diameter, because of the flange 13 against which the skirt bears at 14, while permitting inward radial contraction of the skirt and on the boss diameter. The element 10 and the piston metal are therefore stressed, that is, placed under compression radially as well as circumferentially. In such cooling from solidification temperature to room temperature, the piston will therefore assume a slightly oval form as shown in dotted lines (exaggerated) in Figure 5; that is permitted because during such cooling, there will be a sufficient slip between the element sectors 12 and the top of the skirt and the head of the casting in the boss regions. The piston is now machined to size with the circumference either in the form of a circle or slightly oval with the major axis along the thrust face diameter and with the minor axis along the wrist pin boss diameter.

If the piston produced as described above is placed in the engine, the head will, of course, heat and that heat will be transmitted to the skirt. The head will, of course, expand radially in all directions. Such radial expansion of the head will, however, only be transmitted to the skirt in the regions of the bosses, so that the skirt will move out on the boss axis. That is again permitted because, upon such expansion, the head will expand somewhat axially (vertically, Figure 4), with reference to the skirt so as to again relieve the circumferential parts 12 of the control element 10 with reference to the head. Accordingly, the action will be to relieve some of the strain along the wrist pin axis so that the piston metal and the control ring can move in along that axis, controlled, however, by the element 10; that is, because the flanges 13 bearing against the inside of the skirt at 14 will move in. That will cause the piston to tend to return to its original (viz., round or slightly oval) form. In doing so, the strain in the piston metal at the thrust faces is relieved so as to move in with the control element at those faces.

Figures 6, 7:
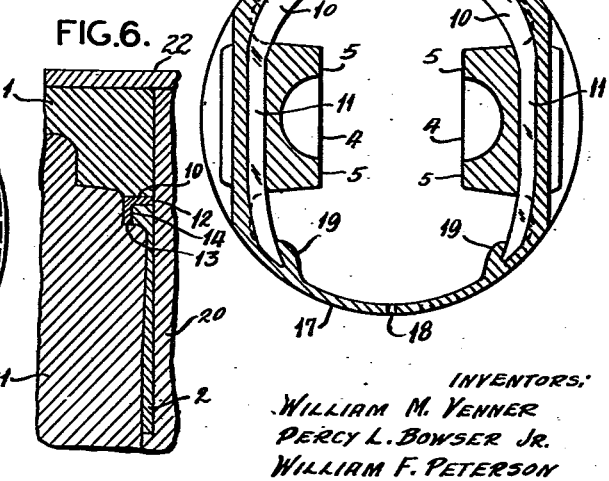
Figure 6 is a sectional view of a part of Figure 4, but showing the mold and the part of the core in place.
Figure 7 is a detail similar to Figure 3, but showing another embodiment of this invention.

In the embodiment shown in Figure 7, the circumferential part 12 is omitted at one (lower) thrust face, with the side parts 11 only anchored in the piston metal in the regions of the bosses and these side parts may extend to the opposite thrust face as shown in Figure 7, and bear against bosses 19. The thrust face 17 may also be provided with a vertical slot 18 extending partly to the top of the skirt. This invention, therefore, contemplates a construction in which the control element is either in the form of a complete ring or of U-form.

In accordance with this invention, therefore, a new piston is provided having a new mode of operation. A piston of a metal of relatively high thermal expansion, comprising a head and a skirt provided with wrist-pin bosses and with thrust faces, has a control element of a metal of relatively low thermal expansion positioned at the top of the skirt and over which the piston metal is cast. The side parts of the element are permanently cast-anchored in the regions of the bosses, while a sector or sectors of the element extend through one or both thrust faces, but are radially unanchored therein and have a part or parts bearing against the inside of one or both thrust faces. The element and the piston metal are therefore placed under stress when the piston becomes cold, operating to move the skirt outwardly at one or both thrust faces, which stress will, however, be progressively relieved as the piston heats up in the engine, adapted to maintain the skirt dimension diametrically.

While various designs may be employed, an example of an actual commercial embodiment is shown in the drawing, Figures 1–5, which is to scale, and in which the piston metal is of an aluminum alloy and the control element is of cold rolled steel. Such a piston is designed with a skirt having a diameter of 3.67 inches. From the top of the head to the top of the control element, the distance is 1.06 inches, and the length of the skirt is 2.35 inches. The steel element has a thickness of 0.07 inch, the width of the part 11 is 0.16 inch, the width of the part 12 is 0.27 inch, and the depth of the flange 13 is 0.19 inch. Such a piston will remain conformed to the cylinder with a very low clearance, even below 0.001 inch.

It will therefore be seen that the invention accomplishes its purpose. A piston is provided which can be closely fitted to a cylinder of an internal combustion engine and which will maintain its dimensions from hot to cold so that there will be no seizing when hot and no slapping when cold.

Having thus described the invention, what is claimed and desired to be secured by Letters Patent is:

1. A trunk piston of a metal of relatively high thermal expansion, comprising, a head, a skirt provided with wrist pin bosses and with thrust faces, a control element of a metal of relatively low thermal expansion positioned at the top of the skirt and over which the piston metal is cast, having side parts permanently cast-anchored in the regions of the bosses and having a sector extending along and through a thrust face but radially unanchored therein and having a part bearing against the inside thereof, said control element and the piston metal being under stress when the piston is cold, which stress will be progressively relieved as the piston heats up in the engine, adapted to maintain the skirt dimension diametrically.

2. A trunk piston of a metal of relatively high thermal expansion, comprising, a head, a skirt provided with wrist pin bosses and with thrust faces, a control element of a metal of relatively low thermal expansion, positioned at the top of the skirt and over which the piston metal is cast, having side parts permanently cast-anchored in the regions of the bosses and having sectors extending along and through the thrust faces but radially unanchored therein and having parts bearing against the inside thereof, said control element and the piston metal being under stress when the piston is cold, which stress will be progressively relieved as the piston heats up in the engine, adapted to maintain the skirt dimension diametrically.

References Cited in the file of this patent

UNITED STATES PATENTS

| | | |
|---|---|---|
| 1,874,925 | Diamond | Aug. 30, 1932 |
| 1,946,530 | Hanch | Feb. 13, 1934 |
| 2,313,202 | Korytko | Mar. 9, 1943 |
| 2,715,052 | Jardine | Aug. 9, 1955 |

FOREIGN PATENTS

| | | |
|---|---|---|
| 286,867 | Great Britain | Mar. 15, 1928 |